United States Patent [19]

Schumacher et al.

[11] Patent Number: 5,126,117
[45] Date of Patent: Jun. 30, 1992

[54] DEVICE FOR PREVENTING ACCIDENTAL RELEASES OF HAZARDOUS GASES

[75] Inventors: John C. Schumacher, Carlsbad; Lawrence B. Anderson, Encinitas; Timothy E. Hammon, Cardiff, all of Calif.

[73] Assignee: Custom Engineered Materials, Inc., Oceanside, Calif.

[21] Appl. No.: 526,855

[22] Filed: May 22, 1990

[51] Int. Cl.$^5$ ............................................. B01D 53/34
[52] U.S. Cl. ...................................... 423/210; 55/69; 55/387; 55/482; 422/169
[58] Field of Search .................... 55/69, 315, 387, 482; 422/169; 423/210; 220/88.3; 241/31; 299/12

[56] References Cited

U.S. PATENT DOCUMENTS 4,593,148 6/1986 Johnson et al. .................... 423/210

OTHER PUBLICATIONS

Brochure from Matheson Gas Products.
Literature by Advanced Technology Materials, Inc. "Gas Management System Products".
Literature by Advanced Technology Materials, Inc. "Emergency Toxic Gas Scrubber".

Primary Examiner—John Niebling
Assistant Examiner—Brian M. Bolam
Attorney, Agent, or Firm—Knobbe Martens Olson & Bear

[57] ABSTRACT

A system for containing and detoxifying a gaseous stream, comprising a storage housing containing one or more sources of toxic gas, means for applying negative pressure to the storage housing to continuously exhaust a gaseous stream therefrom, and a treatment housing interposed in the gaseous stream, the treatment housing containing one or more layers of solid sorbent material capable of removing the toxic gas from the stream, wherein a flow of treated gas that exits the treatment unit may be safely released to the environment.

21 Claims, 2 Drawing Sheets

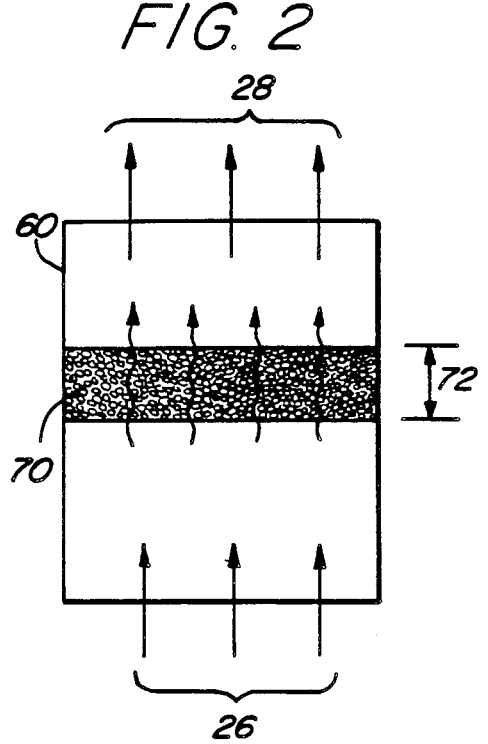
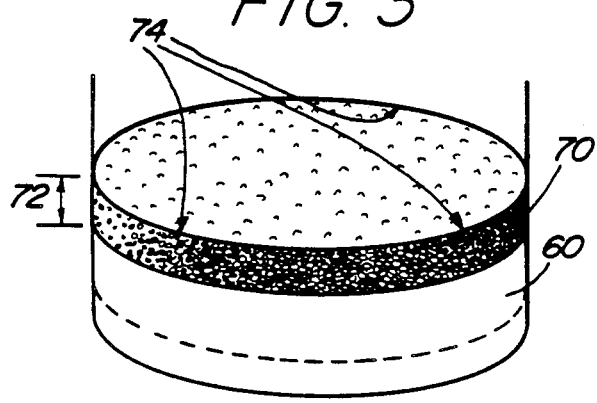
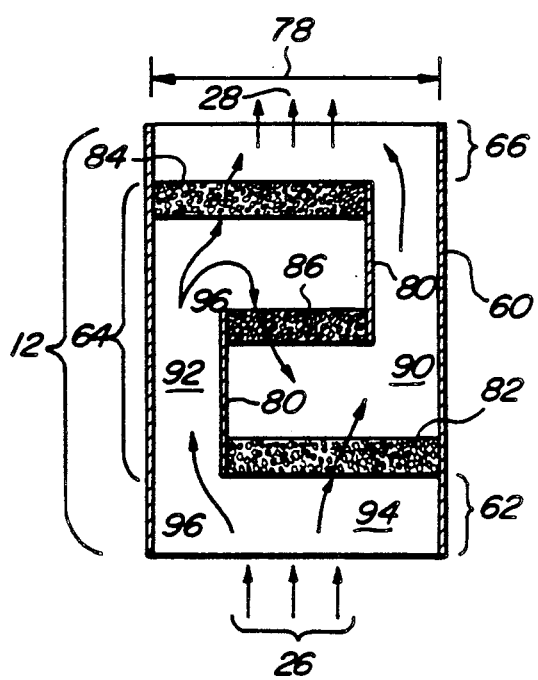
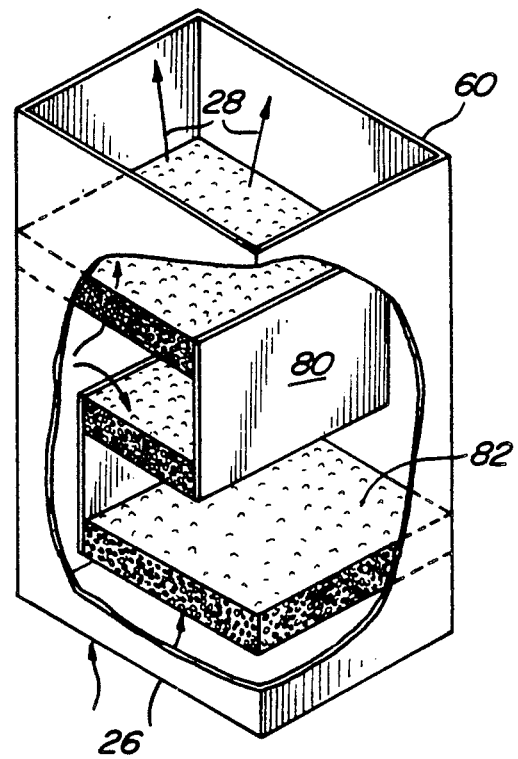

DEVICE FOR PREVENTING ACCIDENTAL RELEASES OF HAZARDOUS GASES

FIELD OF THE INVENTION

This invention relates generally to the treatment of hazardous gases and more particularly to the emergency isolation and treatment of stored, hazardous compressed gases through the use of sorbents arranged in one or more porous layers of sorbent material.

BACKGROUND OF THE INVENTION

Despite the continuous risk of harm their availability creates, hazardous gases are essential to many industries for use in a variety of manufacturing processes. For instance, the semiconductor industry utilizes certain hazardous gases for deposition and etching processes. Used during the fabrication of integrated circuits, the hazardous gases are processed in systems such as chemical vapor deposition and diffusion reactors.

This industry demand for hazardous gases invariably requires the storage of these gases at a location proximate to its ultimate use. In most cases the compressed gas is stored in high pressure metal cylinders, which are readily available at most bulk gas suppliers.

As one would expect, a danger is posed that any one of the cylinder containers may leak at some future date. The release of hazardous gases into the environment is an intolerable form of deadly air pollution. As a result, local standards have been promulgated to which the users of stored hazardous gases must adhere in order to prevent or certainly minimize such risks.

Specifically, Article 80 of the Uniform Fire Code requires that some type of treatment system be installed at the storage location for the isolation and treatment of potentially escaping gas. According to Article 80 requirements, an acceptable treatment process for the accidental release of the entire contents of the largest single container of hazardous gas in a five or thirty minute period, depending on the state (vapor or liquid) of the gas prior to escape, must reduce its effluent concentration to less than one-half of the "immediately dangerous to life and health value" (IDLH) set by the Occupational Safety and Health Administration. If the gas is stored in the form of vapor, the contents are considered releasable over a five minute period. For gas stored in the form of a condensed liquid, the appropriate time period for release is thirty minutes.

In addition to the treatment requirements, Article 80 requires that hazardous compressed gases be stored in a ventilated environment, wherein any escaping gas is isolated and directed to the treatment process. The conventional apparatus for furnishing a ventilated environment is generally referred to as a gas storage cabinet. This cabinet is plumbed into a ventilation system that applies a negative pressure to the cabinet. As air is drawn through and out of the cabinet, any escaping gas is simultaneously drawn from the cabinet as a hazardous gas mixture.

Certain provisions of the Uniform Fire Code require that any access part in a ventilating gas cabinet have a minimum face velocity of 200 ft/min of air to prevent back diffusion into the work area. Typically, this level translates into 250 to 350 cubic feet per minute (CFM) of air flow from any one gas cabinet.

Where hazardous gas is used in the processing of other products, the processed gas is removed as "spent" gas. The spent gas is exhausted from the manufacturing process in the form of waste effluent which may be recycled. However, most often this gaseous effluent cannot be reused and must therefore be treated and subsequently released.

In general industry practices, on-going ventilation and treatment is provided for the spent hazardous effluent gas. However, because the flow of hazardous gas through the manufacturing process is generally at low rates, treatment of the hazardous effluent gas is often accomplished inexpensively.

In the case of chemical vapor deposition reactors, referred to above, hazardous effluent gas flow rates are in the range of ½ to 1½ CFM per reactor, permitting effective and economical treatment by relatively low volumetric flow combustion devices, i.e., low volume incinerators. Low volume incinerators are effective at incinerating the hazardous gas into a non-hazardous waste product. An accidental release of hazardous gas from a supply cylinder within the processing flow system can adequately be addressed by the low volume incinerator. However, an accidental release into the ventilation system involves too excessive an air flow for such low volume incinerators. Consequently, safety and capacity requirements dictate using a larger, more expensive incinerator to insure against the risk of such an event. However, in addition to the considerable capital expense of the larger incinerator, operating expenses would significantly increase as it is necessary to operate the incinerator continuously to guard against an accidental release.

The air withdrawn from the gas cabinets is typically processed by a water scrubber. Many hazardous gases, however, are not water soluble and are not efficiently removed by water scrubbers. For example, conventional scrubbers are not effective to remove hydride gases such as arsine, diborane, and phosphine. A water scrubber is a device wherein water is injected at a direction generally countercurrent to a flow of gas to be treated. The gas is dissolved and the solution settles into a collection reservoir where it may be directed for further treatment.

For material released into the ventilation system that is not water soluble, no presently-available means exist for efficiently and economically treating such materials to acceptable levels. However, there are methods presently available for chemically treating such materials. For instance, liquid scrubbers using compounds such KMnO4, KOH and other similar compounds, have been tested and shown to improve the scrubbing efficiency insoluble hazardous gas so as to permit some level of treatment. However, the results of such tests indicate average capabilities of only 50% treatment with each scrubber. This less-than-efficient rate of treatment often proves to be uneconomical as multiple scrubbers in series are required in order to treat accidentally released gas.

By way of illustration, the following hypothetical projection is offered. There is stored a 4-pound bottle of 100% arsine (AsH3) as the largest container in a group of six gas cabinets containing similar materials, each cabinet furnished with 250 CFM of ventilation. If the exhaust from each gas storage cabinet is manifolded together as part of a unitary treatment system, the total air flow through the treatment device is 1500 CFM. It must be noted that AsH3 stored in high pressure containers is in a liquid state. Therefore the following calculations are based on the release of 4 pounds of AsH3 over a 30 minute isolation and treatment period as permitted by Article 80 of the Uniform Fire Code.

Assume for the moment that this bottle of Arsine develops a leak into the air moving through its respective gas cabinet. The resulting permissible flow rate for 4 pounds of escaping Arsine in a 30 minute period is 0.13 lbs/minute or 60.4 grams/minute. Based on a molecular weight of 76.0 grams for AsH3, the required treatment rate is $60.4/76.0 = 0.8$ mole/minute. At 22.25 liters/mole of 100% AsH3, the release rate translates to 17.8 liters/minute or 0.64 CFM. The effluent concentration of Arsine gas is therefore $0.64/1500 = 424$ parts per million (ppm). The IDLH of 100% AsH3 established by OSHA is 6 ppm. Pursuant to Article 80, the level of required treatment is one-half of the IDLH, or 3 ppm, in order to achieve compliance. Beginning with a release concentration of 424 ppm, seven 50%-efficient liquid scrubbers in series, each large enough to handle a 1500 cfm airflow, would be required to achieve this result. The economic impracticability of such an arrangement is readily apparent.

There is, therefore, a need for a system to efficiently treat a gas stream containing such hazardous gases to reduce their concentration to acceptable levels. In addition, there is a need for such an efficient treatment means that is also cost-effective in treating accidentally-released hazardous gas from bulk storage containers.

SUMMARY OF THE INVENTION

One important advantage of the present invention rests on its capability for providing a cost-effective treatment means for accidentally-released hazardous gases which is effective in treating such gases to acceptable levels. The inventive apparatus incorporates a bed of inorganic oxide material ("sorbent") through which the flow of hazardous gas passes when accidentally released. The sorbents are sized and shaped to minimize pressure drop across the bed. Preferably consisting of absorbing material, the bed of sorbents is believed to depend primarily on a process of chemical bonding or chemical reaction, and secondarily on physical bonding, to reduce the potential for re-release of hazardous gas into the treated flow stream.

Thus one embodiment of the invention is a system for containing and detoxifying a gaseous stream comprising a storage housing containing one or more sources of toxic gas, means for applying negative pressure to the storage housing to continuously exhaust a gaseous air stream therefrom, and a treatment housing interposed in the gaseous stream wherein the treatment housing contains solid sorbent material capable of removing the toxic gas from the stream and wherein the flow of treated gas that exits the treatment unit may be safely released to the environment. The storage housing may comprise a gas storage cabinet, having sealed walls and at least one intake vent and one exhaust vent, which houses a plurality of cylinders in which toxic gas may be stored and where several gas storage cabinets may be manifolded together into the treatment housing. Furthermore, it is contemplated that gas storage cabinet have an average face velocity of 200 ft/min. of air flow.

In another embodiment, the invention provides a treatment housing which contains at least one layer of sorbent material positioned across the treatment housing and orthogonal to the flow of the gaseous stream and a plurality of discrete flow plenums may be created, each separated by sorbent material. The treatment housing may further comprise a plurality of layers of sorbent material positioned in series and spaced a finite distance from one another, the layers separated from one another by one of a plurality of non-porous walls, the non-porous walls and an interior periphery of the treatment housing collectively defining the discrete plenums.

It is contemplated that the treatment system of the present invention be capable of treating a hazardous or toxic gas such as a hydride gas, for example, arsine, phosphine or diborane, and that the sorbent material be an absorbent material capable of chemically interacting with the toxic gas. In another embodiment, the sorbent material is a metal oxide compound, for example cupric oxide. It is further contemplated that the treatment system described herein be used as part of a semiconductor fabrication facility, although it is to be noted that the treatment system may be useful in other industrial processes.

In yet another embodiment of the present invention, there is provided a method for treating hazardous gases comprising the steps of continuously applying negative pressure to a gas storage unit containing a source of hazardous gas in order to remove air and any leaking hazardous gas as a gas stream from the unit, and directing the gas stream through a treatment unit having at least a first plenum and through at least one layer of sorbent material housed in the treatment unit, thereby removing any hazardous gas from the gas stream. It is contemplated that where a plurality of plenums are created in the treatment unit, that the method above further includes directing a first portion of the hazardous gas through a first layer of sorbent material, wherein a certain amount of a second portion of hazardous gas is directed through a second layer of sorbent material and a remaining amount of the second portion of hazardous gas is directed through a third layer of sorbent material. In another embodiment, the method above further comprises the step of isolating the gaseous stream leaving the storage unit by directing it through a flow plenum interposed between the gas storage cabinet and the treatment unit so that gas drawn from the storage cabinet is directed to the treatment unit under negative pressure, the negative pressure alternatively being created by a conventional scrubber or simply an exhaust fan.

BRIEF DESCRIPTION OF THE DRAWINGS

FIG. 2 is a schematic elevational view of another embodiment of the treatment unit of the invention.

FIG. 3 is a perspective of the layer of sorbent material illustrated in FIG. 2.

FIG. 4 is an schematic elevational view of the treatment unit of FIG. 1.

FIG. 5 is a perspective view of the treatment unit of FIG. 4, partially cut away.

DETAILED DESCRIPTION OF THE INVENTION

Figure 1:
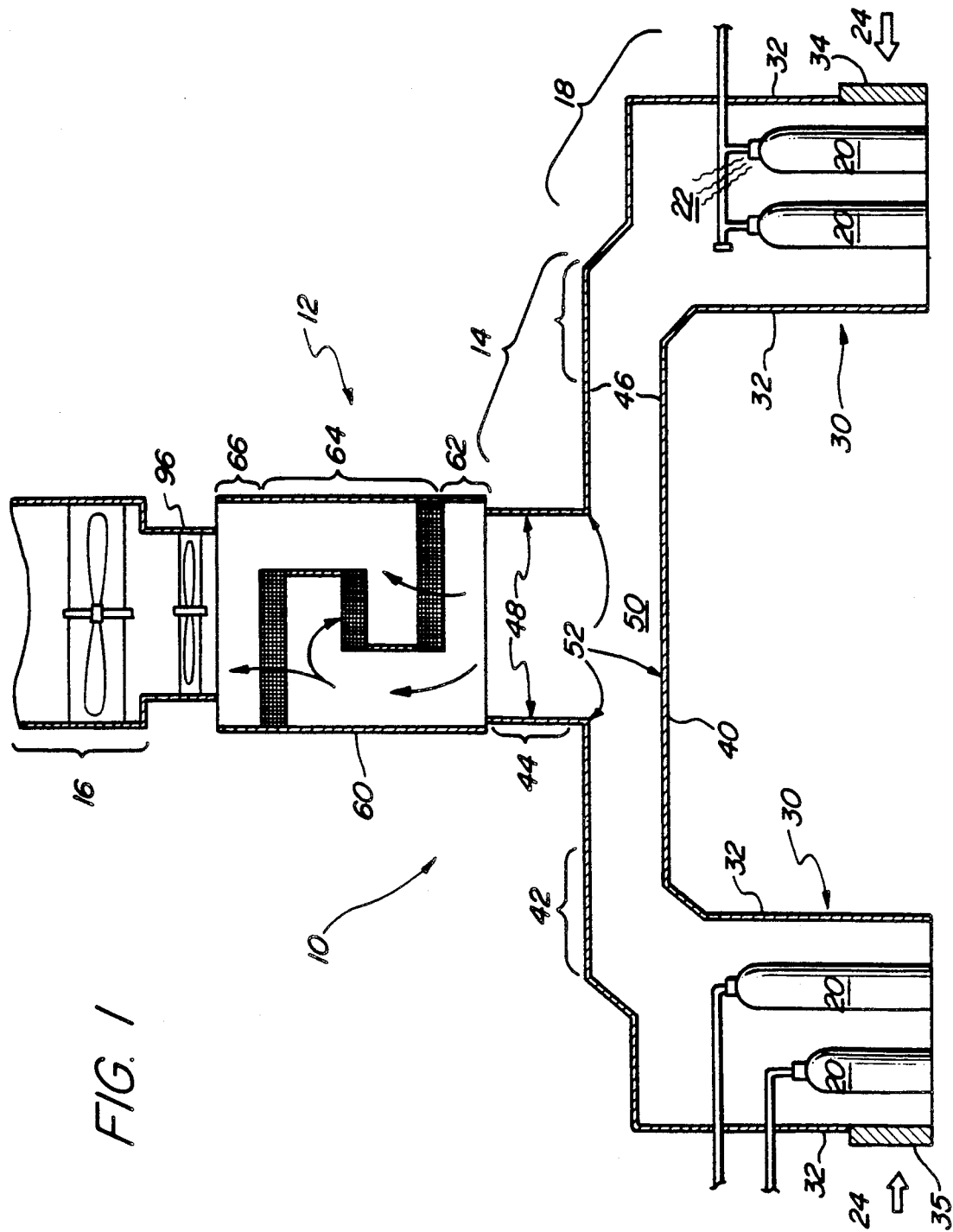
FIG. 1 is a schematic view of one embodiment of the present invention showing a treatment device, for the treatment of hazardous gases, having a treatment unit, an isolating means and a ventilation unit.

Reference is now made to the figures wherein like parts are designated with like numerals throughout.

The treatment device of the present invention comprises a cooperating system of four components, as may be seen in FIG. 1. There, one embodiment of the hazardous gas treatment device 10 is shown comprising a treatment unit 12, an isolating means 14, a ventilating unit 16, and a storage unit 18, each of which are described in further detail below.

From FIG. 1 it may be appreciated that the system includes a plurality of gas storage cylinders 20 wherein one or more may be mechanically connected to a manufacturing processing unit (not shown) which utilizes a compressed hazardous gas stored in the cylinders 20. The treatment device 10 operates inventively to react to an accidental release of hazardous gas 22 by mixing the released gas with an influx of ambient air 24 drawn through the system by the ventilating unit 16. The hazardous gas mixture 26 leaving the vicinity of the gas storage cylinders is directed through the isolating means 14 and onto the treatment unit 12 for treatment. Following sufficient treatment through the treatment unit 12, the hazardous gas 22 is exhausted as treated effluent gas 28 into the ventilation means 16, which may be a conventional scrubber, or directly to the atmosphere.

Still referring to FIG. 1, the gas cylinders 20 are housed in the storage unit 18. Preferably comprising a gas storage cabinet 30, the storage unit 18 has exterior walls 32 enclosing the gas storage cylinders 20. Where necessary a plurality of gas cabinets 30 may be fluidly interconnected by the isolating means 14 discussed more fully below. As multiple gas storage units are preferably configured similarly, a description of one gas storage unit will suffice for explanatory purposes. The gas storage cabinet 30 of the preferred embodiment is furnished with at least one intake vent 34 comprising a ventilation grille commonly found in the heating, ventilating and air conditioning (HVAC) field. Ambient air is drawn into and through the gas cabinet 30 through this vent 34.

It may be seen from FIG. 1 that the isolating means 14 is positioned in between the gas storage cabinet 30 and the treatment unit 12 and provides fluid communication thereto. Where the amount of stored hazardous gas dictates utilizing only one gas storage cabinet 30, a first embodiment of the isolating means 14 will consist of a sealed isolating plenum having one intake zone 42 at one end and an exhaust zone 44 at the other end. However, where more than one gas storage cabinet 30 is required, a second embodiment of the isolating means 14 consists of a sealed isolating plenum having multiple intake zones 42 as shown in FIG. 1. There it may be seen that two gas cabinets 30 are fluidly interconnected by the isolating plenum 40 of the treatment device 10. It is intended that other embodiments of the isolating means 14 be configured to fluidly interconnect an unlimited number of gas storage cabinets 30, the isolating means of these embodiments having a number of intake zones 42 at least equal to the number of gas storage cabinets 30. However, for explanation purposes only, an isolating means interconnecting two ventilation units and the treatment unit will be described in reference to FIG. 1.

Referring again to FIG. 1, the intake zone 42 is defined by an intake plenum 46 while the exhaust zone 44 is similarly defined by an exhaust plenum 48. Intermediate of the intake zone 42 and the exhaust zone 44 is a manifold zone 50, defined by a manifold plenum 52, wherein the flows of exhausted hazardous gas 22 from the gas cabinets 30 are combined and channeled on through the exhaust zone 44 prior to introduction into the treatment unit.

Having passed from the gas cabinet 30 to the isolating means 14, the accidentally-released hazardous gas 22 in the hazardous gas mixture 26 is then directed into the treatment unit 12. Referring to FIG. 1, the treatment unit comprises a housing, defined by a housing periphery 60, having an inlet zone 62, a treatment zone 64 and an outlet zone 66. As discussed above, the treated effluent gas 28 exits the treatment unit and is either directed toward further treatment in a secondary treatment device, such as a conventional scrubber (not shown), or directly to the atmosphere. As illustrated in FIG. 1, the hazardous gas 22 flows directly from the isolating means into the treatment unit where it may be treated as described below.

In one preferred embodiment of the treatment unit 10, illustrated in FIG. 2, a single porous layer of particulate material, such as sorbent material 70, is positioned orthogonally to the flow of hazardous gas passing through. Referring momentarily to FIG. 3, it may be seen that the sorbent material is securely confined in a bed having a thickness 72 and a cross-sectional area 74. The outer perimeter of the layer of sorbent material 70 may be defined by the cross-sectional configuration of the housing periphery 60, as shown in FIG. 3, and is securely attached thereto. Referring back to FIG. 2, it may be seen that as the hazardous gas mixture 26 is forced through the treatment unit the hazardous gas penetrates the layer of sorbent material 70, wherein molecules of hazardous gas are removed from the gaseous stream. Where sufficient sorbent material exists in the layer, the concentration of hazardous gas in the mixture 26 can be reduced significantly to safe levels. It has been discovered through trial and error that effective treatment is provided by a layer of absorbing material 12 inches thick and having a cross-sectional area equal to at least 1/30 square foot for every cubic foot per minute (CFM) of hazardous gas mixture 26 flow through the treatment unit 12. For instance, a quantity of flow equal to 1000 CFM requires a 12-inch-thick layer of absorbing material 33.33 square feet in area, which translates into a diameter of approximately 6.5 feet for a cylindrical treatment unit. As one may readily see, much higher flows will require large layers of absorbent material, which may render a single, flat layer impractical. Consequently, a second embodiment, described below in reference to FIG. 4, may be more effective for providing greater flows in a smaller treatment unit.

Referring now to FIG. 4, it may be seen that one advantageous embodiment of treatment zone 64 comprises a plurality of parallel layers of sorbent material 70 housed within the housing periphery 60. By increasing the number of layers of sorbent material, the width 78 of treatment unit 12 is decreased. Inventively, the layers are positioned in a staggered formation and separated by nonporous walls 80. One embodiment of the treatment unit 12 houses multiple spaced layers of sorbent material, wherein a first lower layer of sorbent material 82 extends from along a portion of the housing periphery 60 and spans only partially across the cross-section of the treatment zone 62. A second upper layer of sorbent material 84 is similarly positioned but extends from a portion of the housing periphery 60 opposite from where the first lower layer extends. Finally, a third middle layer 86 is positioned proximate to the midpoint between the first and second layers and is suspended therefrom by the non-porous walls 80. It will be better appreciated by referring to the perspective view of the preferred embodiment, shown in FIG. 5, how the layers are positioned relative to each other. While FIG. 4 illustrates a cubically configured treatment unit 12, it is contemplated that the preferred embodiment may also be configured in a cylindrical fashion or any other obvious geometric configuration. It is further contemplated that more than three layers of sorbent material may be positioned within the treatment zone 64.

Of course, there are many equivalent ways to provide a large surface area of sorptive material in a small footprint. Thus, pleated or accordion-shaped layers of sorbent may be provided, held in place using appropriate supports, such as mesh or screen.

Again referring to FIG. 4, it may be seen that two separate flow plenums 90 and 92 are defined by the arrangement of sorbent layers 82, 84, 86 and non-porous walls 80. Where more than three layers of sorbent material are utilized, as indicated above, additional flow plenums may be defined. However, for explanatory purposes only, a description of the two plenums of FIG. 4 will be sufficient. As the hazardous gas mixture 26 enters the treatment zone 64, the gas is divergently directed into the two plenums, wherein a first diverted gas flow 94 penetrates the first layer of sorbent material 82 and passes on into plenum 90. A second diverted gas flow 96 continues on through plenum 92 towards the second upper layer 84 and the top portion of the third layer 86. The second diverted gas flow 96 is then further divergently directed into a portion penetrating the second layer 84 and another portion penetrating the third layer 86. This latter portion penetrating the third layer is combined with first diverted flow 94 in plenum 90 and continues upwards toward the outlet zone 66. The former portion penetrating the second layer is combined with the other treated flows at the outlet zone so that the entire hazardous gas mixture 26 is effectively treated. The combined treated gas exits, from the outlet zone, as treated effluent gas 28.

Referring again to FIG. 1, it should be noted that an optional booster fan 96 may be utilized to compensate for any pressure drop across the sorbent material 70.

In the present invention, the sorbent material is preferably a cupric oxide catalyst, although catalysts or sorbents of other material may also be used. Metal oxides are preferred. Both natural and synthetic zeolites, however, that have or may be treated to have a capture affinity for the particular material, may be used.

One particularly suitable sorbent material is sold under the trade name ARSINE GUARD G-132 by United Catalysts, Inc., Louisville, Ky. This sorbent is a mixture of about 30% by weight cupric oxide (CuO), 60% by weight zinc oxide (ZnO) and about 10% by weight alumina ($Al_2O_3$). Any particulate form permitting adequate gas flow and high surface area can be used; however, one useful form is a pellet form. We have used pellets that are ⅛ inch by 1/16 inch with good results.

With the cupric oxide sorbent and with other metal oxide or zeolite sorbents, gases such as arsine, phosphine, and diborane can be effectively removed from a gas stream. We have been successful removing these materials from air, as well as from nitrogen atmospheres. Of course, the present invention can be used on a wide variety of toxic or dangerous gases by matching the sorbent to the gas.

The particular mode of action of the sorbent is not fully understood. With a metal oxide sorbent and a hydride gas, an oxidation reaction is believed to take place, converting the toxic gas into a solid metal compound within the sorbent material. However, sorption processes that do not involve chemical reactions can also be utilized in the invention. Also, teaming such sorptive materials with an oxidizing agent, such as potassium permanganate, may provide a dual sorptive/oxidizing effect.

It is to be understood that the present invention may be embodied in other specific forms without departing from its spirit or essential characteristics. The described embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed:

1. A method for treating gas storage cabinet exhaust containing a mixture of air and hazardous gas, said method comprising the steps of:
   continuously applying negative pressure to a gas storage cabinet containing a source of hazardous gas to remove air and any leaking hazardous gas as gas cabinet exhaust from said cabinet;
   continuously directing the gas cabinet exhaust through a treatment unit having at least a first plenum and through at least one layer of sorbent material housed in the first plenum, thereby removing any hazardous gas from said gas stream.

2. The method of claim 1 wherein the treatment unit further comprises a plurality of discrete flow plenums in parallel each having at least one layer of sorbent material through which said gas stream is directed.

3. The method of claim 2 wherein the sorbent material is an absorbing material capable of chemically interacting with the hazardous gas.

4. The method of claim 3 wherein the sorbent material is a metal oxide compound.

5. The method of claim 4 wherein the metal oxide compound is capable of treating arsine, phosphine, and diborane.

6. The method of claim 2, further comprising the step of directing a portion of hazardous gas removed from the gas storage unit into a second of the plurality of discrete flow plenums in the treatment unit.

7. The method of claim 6 wherein multiple layers of sorbent material are positioned in parallel plenums, a first layer located in the first plenum and a second layer located in a second plenum.

8. The method of claim 7 wherein the layers of sorbent material are each separated by one of a plurality of non-porous walls, said non-porous walls and the housing periphery collectively defining the plenums.

9. The method of claim 5 wherein a second portion of hazardous gas removed from the gas storage unit is directed through a third layer of sorbent material.

10. The method of claim 1 wherein the gas storage unit is at least one gas storage cabinet having sealed walls and at least one intake vent and one exhaust vent.

11. The method of claim 10, further comprising the step of isolating the gaseous stream leaving the storage unit by directing it through a flow plenum interposed between the gas storage cabinet and the treatment unit so that gas drawn from said storage cabinet is directed to the treatment unit under negative pressure.

12. The method of claim 11 wherein a negative pressure is created by a scrubber.

13. The method of claim 10 wherein the gas storage cabinet houses a plurality of cylinders in which the hazardous gas is stored.

14. The method of claim 10 wherein a plurality of gas storage cabinets are manifolded together.

15. The method of claim 10 wherein the gas cabinet has an average face velocity of 200 ft/min of air flow.

16. The method of claim 1, wherein the method is practiced on gas cylinders supplying gas to a semiconductor fabrication process.

17. The method of claim 1, wherein said hazardous gas is a hydride gas.

18. The method of claim 1, wherein said hazardous gas is phosphine, arsine, or diborane.

19. The method of claim 18, wherein said sorbent is a metal oxide.

20. A method for treating vented gas storage cabinet exhaust containing the accidental release of hazardous gas from compressed cylinders stored in a gas storage cabinet, said method comprising the steps of:

enclosing at least one source of hazardous gas in the vented gas storage cabinet;

continuously applying negative pressure to the vented gas storage cabinet so as to draw ambient air from outside said gas storage cabinet into said cabinet;

mixing the ambient air with any hazardous gas which accidentally leaks from the cylinder so as to form a mixture of air and hazardous gas;

directing the mixture away from the gas cabinet and towards a treatment unit; and directing a first portion of the mixture into a first plenum of the treatment unit and across a first layer of sorbent material capable of chemically interacting with the hazardous material so as to produce a first treated effluent.

21. The method of claim 20, further comprising the steps of:

directing a second portion of the mixture into a second plenum and across a second layer of sorbent material so as to produce a second treated effluent;

combining the first and second treated effluents into a single plenum; and discharging said treated effluents into the atmosphere.

* * * * *